(12) United States Patent
Tanaka et al.

(10) Patent No.: US 8,111,962 B2
(45) Date of Patent: Feb. 7, 2012

(54) OPTICAL FIBER CONNECTION STRUCTURE AND SINGLE-MODE FIBER

(75) Inventors: Masatoshi Tanaka, Amagasaki (JP); Masayoshi Hachiwaka, Amagasaki (JP); Haruo Ooizumi, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 13/120,745

(22) PCT Filed: Aug. 21, 2009

(86) PCT No.: PCT/JP2009/004030
§ 371 (c)(1), (2), (4) Date: Mar. 24, 2011

(87) PCT Pub. No.: WO2010/035398
PCT Pub. Date: Apr. 1, 2010

(65) Prior Publication Data
US 2011/0176766 A1 Jul. 21, 2011

(30) Foreign Application Priority Data
Sep. 24, 2008 (JP) .............. 2008-244567

(51) Int. Cl.
*G02B 6/02* (2006.01)
(52) U.S. Cl. ........ 385/126; 385/122; 385/123; 385/124; 385/125; 385/127; 385/128
(58) Field of Classification Search .......... 385/122–128
See application file for complete search history.

(56) References Cited

U.S. PATENT DOCUMENTS

| 4,204,745 | A * | 5/1980 | Sakai et al. ............ 385/124 |
| 4,877,304 | A | 10/1989 | Bhagavatula |
| 6,539,155 | B1 * | 3/2003 | Broeng et al. ............ 385/125 |
| 6,621,968 | B1 * | 9/2003 | Yun et al. ............ 385/123 |
| 7,403,689 | B2 * | 7/2008 | Koch et al. ............ 385/125 |
| 2005/0105867 | A1 * | 5/2005 | Koch et al. ............ 385/125 |
| 2005/0157998 | A1 * | 7/2005 | Dong et al. ............ 385/126 |

FOREIGN PATENT DOCUMENTS

| JP | 01-163707 A | 6/1989 |
| JP | 2002-528757 A | 9/2002 |

(Continued)

OTHER PUBLICATIONS

International Search Report Issued in International Application No. PCT/JP20091004030 on Nov. 17, 2009.

(Continued)

*Primary Examiner* — Brian M. Healy
*Assistant Examiner* — Guy Anderson
(74) *Attorney, Agent, or Firm* — Knobbe Martens Olson & Bear LLP

(57) ABSTRACT

An optical fiber connection structure which reduces MPI in the use of an optical fiber with a bend resistance improved by forming holes in the fiber, and a single-mode fiber which reduces MPI are provided. A second cladding portion of a second single-mode fiber 20 includes holes 28, and thus, the second single-mode fiber 20 has low bending loss. A portion of the second single-mode fiber 20 connected to a first single-mode fiber 10a is made solid by filling corresponding portions of the holes 28 over the length L0, and light in a mode LP11 is significantly attenuated in this portion, thereby reducing MPI.

6 Claims, 3 Drawing Sheets

FOREIGN PATENT DOCUMENTS

| | | |
|---|---|---|
| JP | 2005-062477 A | 3/2005 |
| JP | 2005-250068 A | 9/2005 |
| JP | 2007-025513 A | 2/2007 |
| JP | 2007-316480 A | 12/2007 |
| JP | 2008-164935 A | 7/2008 |

OTHER PUBLICATIONS

Goodwin et al, "Modal Noise in Short Fiber Sections", Journal of Lightwave Technology, 9 (8):954-958 (Aug. 1991).

* cited by examiner

OPTICAL FIBER CONNECTION STRUCTURE AND SINGLE-MODE FIBER

CROSS-REFERENCE TO RELATED APPLICATIONS

This application is the U.S. National Phase under 35. U.S.C. §371 of International Application PCT/JP2009/004030, filed Aug. 21, 2009, which claims priority to Japanese Patent Application No. 2008-244567, filed Sep. 24, 2008. The International Application was published under PCT Article 21(2) in a language other than English.

TECHNICAL FIELD

The present invention relates to optical fiber connection structures and single-mode fibers.

BACKGROUND ART

With the widespread use and development of the Internet, a large amount of information has been exchanged over communication networks, and thus, there has been a need to transmit and receive a larger amount of information at higher speed. Optical fibers are typically used for such transmission and reception of information. In particular, single-mode fibers made of quartz glass are suitable for high-capacity transmission of information, and are used in great quantities as communications fibers.

Normal single-mode fibers each have a structure in which a central portion of the single-mode fiber includes a core having a high refractive index and surrounded by a cladding with a low refractive index, and are fibers in which only a fundamental mode propagates through the core. While such a single-mode fiber is routed, as a main fiber from an information relay point to a user (e.g., a business office or a home), for example, by being disposed along a power transmission line, other optical fibers are used for routing into buildings and wiring in relay devices, and such other fibers and the main fiber are connected together through connectors, etc. In this case, an optical fiber which has a different structure from the main fiber and of which the bend resistance is enhanced can be used as an optical fiber for use in routing into buildings and wiring in relay devices. The reason for this is that there is a need to route optical fibers in small spaces in buildings or relay devices.

CITATION LIST

Non-Patent Document

NON-PATENT DOCUMENT 1: Journal of Lightwave Technology, vol. 9, No. 8, August 1991, pp. 954-958

SUMMARY OF THE INVENTION

Technical Problem

However, the phenomenon has been observed in which when cores of optical fibers connected to each other are misaligned at the interface between the optical fibers, light in a higher order mode is generated in one of the fibers to which transmission light is input, and when the higher order mode is coupled back to a fundamental mode at the fiber exit, this leads to interference (multi-path interference (MPI)), thereby causing power fluctuations. It has become clear that this phenomenon appears, as a problem, only after the coincidence of several conditions, and that when an optical fiber connected to a main fiber is an optical fiber of which the bend resistance is enhanced by forming holes in the fiber, the problem as described above tends to occur.

The present invention has been made in view of the foregoing point, and it is an object of the present invention to provide an optical fiber connection structure reducing MPI in the use of an optical fiber of which the bend resistance is enhanced by forming holes in the fiber, and a single-mode fiber reducing MPI.

Solution to the Problem

In order to solve the above problem, an optical fiber connection structure of the present invention is directed to the structure of portions of first and second single-mode fibers connected together in order to input transmission light through the first single-mode fiber to the second single-mode fiber. The second single-mode fiber includes a core, a first cladding, and a second cladding having a lower refractive index than that of the first cladding at a wavelength of the transmission light, the core, the first cladding, and the second cladding are arranged concentrically in a sequential order from a center of the second single-mode fiber, the second single-mode fiber has a normalized frequency greater than or equal to 2.405 and less than or equal to 3.9, holes are formed in the second cladding to extend along the core, and portions of the holes corresponding to an end portion of the second single-mode fiber connected to the first single-mode fiber are filled over a length greater than or equal to 2 mm and less than or equal to 30 mm so that a corresponding portion of the second cladding is solid. Here, the refractive index of the second cladding is an average, which is obtained under consideration of the ratio between hole portions of the second cladding existing in a cross section of the second cladding and a solid portion thereof existing in the cross section, of the refractive index of hole portions of the second cladding and the refractive index of a solid portion thereof. A situation where the corresponding portion of the second cladding is solid denotes a situation where the corresponding portion of the second cladding is filled with a fiber component without clearance. Specifically, a portion of the second cladding which corresponds to the end portion of the second single-mode fiber connected to the first single-mode fiber and which has a length greater than or equal to 2 mm and less than or equal to 30 mm does not include any hole, and is filled with a fiber component without clearance.

Here, cores are portions of single-mode fibers through which transmission light is passed, and the first and second claddings are portions of single-mode fibers serving to confine the transmission light. The transmission light may slightly penetrate the first and second claddings. The normalized frequency ν is represented by the following expression 1:

$$V^2 = k^2(n1^2 - n0^2)a^2 \qquad \text{Expression 1}$$

where the character k is the wave number of the transmission light, the character n1 is the core refractive index, the character n0 is the cladding refractive index, and the character a is the core radius.

Preferably, the second single-mode fiber further includes a third cladding outside the second cladding, the core has a diameter greater than or equal to 8.2 μm and less than or equal to 10.2 μm, the first cladding has a lower refractive index than that of the core at the wavelength of the transmission light and an outer diameter greater than or equal to 30 μm and less than or equal to 45 μm, the second cladding has a thickness greater than or equal to 7.4 μm, the third cladding has a higher refractive index than that of the second cladding at the wavelength of the transmission light, a relative index difference between the second cladding and the third cladding is greater than or equal to 0.5%, and a relative index difference between the first cladding and the second cladding is greater than or equal to 0.5%.

The first single-mode fiber and the second single-mode fiber can be connected together through a connector, and the end portion of the second single-mode fiber in which a corresponding portion of the second cladding is solid can be contained inside the connector.

A single-mode fiber of the present invention includes a core, a first cladding, and a second cladding, the core, the first cladding, and the second cladding are arranged concentrically in a sequential order from a center of the single-mode fiber, the single-mode fiber has a normalized frequency greater than or equal to 2.405 and less than or equal to 3.9, holes are formed in the second cladding to extend along the core, and portions of the holes corresponding to at least one portion of the single-mode fiber in a longitudinal direction are filled over a length greater than or equal to 2 mm and less than or equal to 30 mm so that a corresponding portion of the second cladding is solid.

The single-mode fiber can further include a third cladding located outside the second cladding, the core can have a diameter greater than or equal to 8.2 μm and less than or equal to 10.2 μm, the first cladding can have a lower refractive index than that of the core at a wavelength of transmission light and an outer diameter greater than or equal to 30 μm and less than or equal to 45 μm, the second cladding can have a lower refractive index than that of the first cladding at the wavelength of the transmission light and a thickness greater than or equal to 7.4 μm, the third cladding can have a higher refractive index than that of the second cladding at the wavelength of the transmission light, a relative index difference between the second cladding and the third cladding can be greater than or equal to 0.5%, and a relative index difference between the first cladding and the second cladding can be greater than or equal to 0.5%.

A portion of the single-mode fiber in which a corresponding portion of the second cladding is solid is preferably formed by filling corresponding portions of the holes by heat.

Advantages of the Invention

Since an optical fiber connection structure of the present invention is configured such that a second single-mode fiber includes a second cladding having holes, and portions of the holes which correspond to an end portion of the second single-mode fiber connected to a first single-mode fiber and each have a predetermined length are filled, the second single-mode fiber can reduce transmission of light in a higher-order mode, thereby reducing MPI.

DESCRIPTION OF EMBODIMENTS

Figure 5:
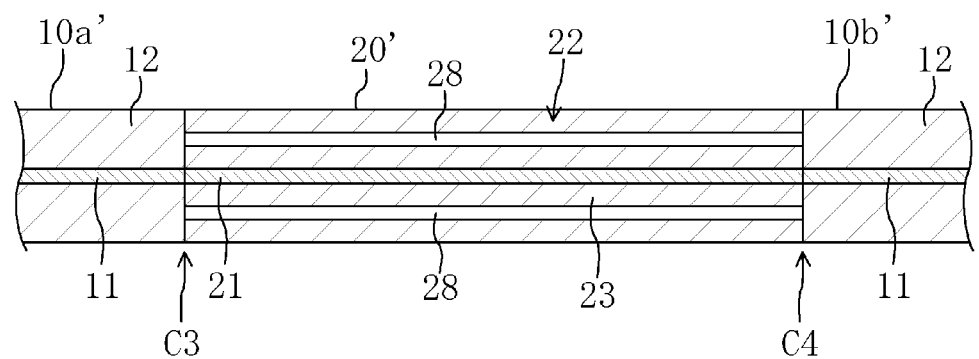
FIG. 5 is a schematic cross-sectional view of portions of optical fibers connected together for comparison with the embodiments.

Before description of embodiments of the present invention, how MPI occurs when optical fibers are connected together will be described with reference to FIG. 5.

When two single-mode fibers $10a'$ and $20'$ are connected together, and light is input through one of the fibers, i.e., the single-mode fiber $10a'$, to the other single-mode fiber $20'$, a fundamental mode LP01 is input through the first fiber $10a'$ to the second fiber $20'$. Here, when cross sections of cores 11 and 21 of both of the fibers $10a'$ and $20'$ are misaligned at the interface C3 between the fibers $10a'$ and $20'$ without being exactly aligned, little light in a higher order mode LP11 is generated at the interface C3. When the second fiber $20'$ is a normal single-mode fiber with a single cladding, light in the mode LP11 is lost after the travel of the light for a very short distance, and thus, only light in the mode LP01 is transmitted.

Here, a situation where connected portions of cores are misaligned denotes a situation where when cross sections of two cores have the same shape and the same size, a portion of one of the cross sections does not overlap with the other cross section, and a situation where when cross sections of two cores have different sizes, a portion of the smaller one of the core cross sections does not overlap with the larger core cross section.

By contrast, when the second fiber $20'$ is a fiber of which the bending loss is reduced, the second fiber $20'$ includes a cladding 22 including a plurality of layers with different refractive indexes in order to increase the bend resistance, and the latter of a cladding layer being in contact with the core and an immediately surrounding cladding layer has a lower refractive index than that of the former thereof. Specifically, here, holes 28 are formed in a second cladding on the outside of a first cladding 23 adjacent to the core 21 to extend along the core 21, thereby reducing the refractive index. With such a structure, the mode LP11 is less likely to be attenuated, and light in the mode LP11 is transmitted to the exit end of the fiber $20'$ over the length of the fiber $20'$ used in a building or a relay device. While the second fiber $20'$ is connected at its exit end to a single-mode fiber $10b'$, etc., near a device, the mode LP11 is coupled back to the mode LP01 at the interface C4 between the fibers, thereby causing MPI. Furthermore, since the mode LP01 and the mode LP11 are transmitted through the fiber $20'$ at different speeds, the re-coupling causes noise.

When interference occurs as described above, optical power I is represented, as described in NON-PATENT DOCUMENT 1, by the following expressions 2:

$$I = A + B\cos(\Phi),\ \Phi = 2\pi L \cdot \Delta n / \lambda \qquad \text{Expressions 2}$$

where the characters A and B are coefficients, the character L is the fiber length, the character $\Delta n$ is the difference between the group index of the mode LP01 and that of the mode LP11, and the character $\lambda$ is the wavelength of transmission light. As seen from Expressions 2, since the difference $\Delta n$ varies with a variation in temperature, the optical power I fluctuates.

In order to prevent such power fluctuations, cores may be prevented from being misaligned at the interface C3. However, since, in connection between optical fibers through connectors, end surfaces of the optical fibers fixed by the connectors are fixed while being opposed to each other, misalignment of cores at the interface cannot be completely eliminated because end surfaces of the cores cannot be located to completely coincide with each other with the current mechanical accuracy of connectors, and the centers of the optical fibers themselves are displaced from the core centers. When cores are observed using a microscope to splice optical fibers, this can prevent core misalignment. However, when fusion splicing is used for routing into buildings and wiring in relay devices, this increases cost and makes it difficult to ensure a workspace, and thus, the use of fusion splicing is very difficult in practice.

The present inventors have conducted various studies in view of the above problem, and have arrived at the present invention.

Embodiments of the present invention will be described below in detail with reference to the drawings. In the following drawings, for simplicity, like reference characters have been used to designate components having substantially the same functions.

First Embodiment

Figure 1:
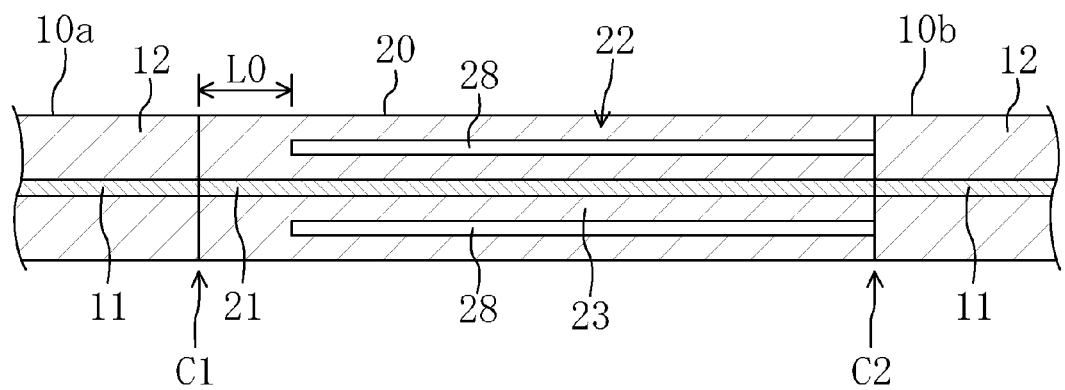
FIG. 1 is a schematic cross-sectional view of portions of optical fibers connected together according to a first embodiment.

A first embodiment is directed to a fiber connection structure including a first single-mode fiber (hereinafter referred to as the first SMF) 10a which is an input single-mode fiber, an output SMF 10b, and a second SMF 20 interposed therebetween as illustrated in FIG. 1. The first SMF 10a and the output SMF 10b each have a single cladding 12, are normal single-mode fibers having high bending loss, and are both the same type of fibers having the same core diameter and the same cladding diameter. The second SMF 20 is a bend resistant fiber having lower bending loss than that of the first SMF 10a and that of the output SMF 10b.

Figure 2:
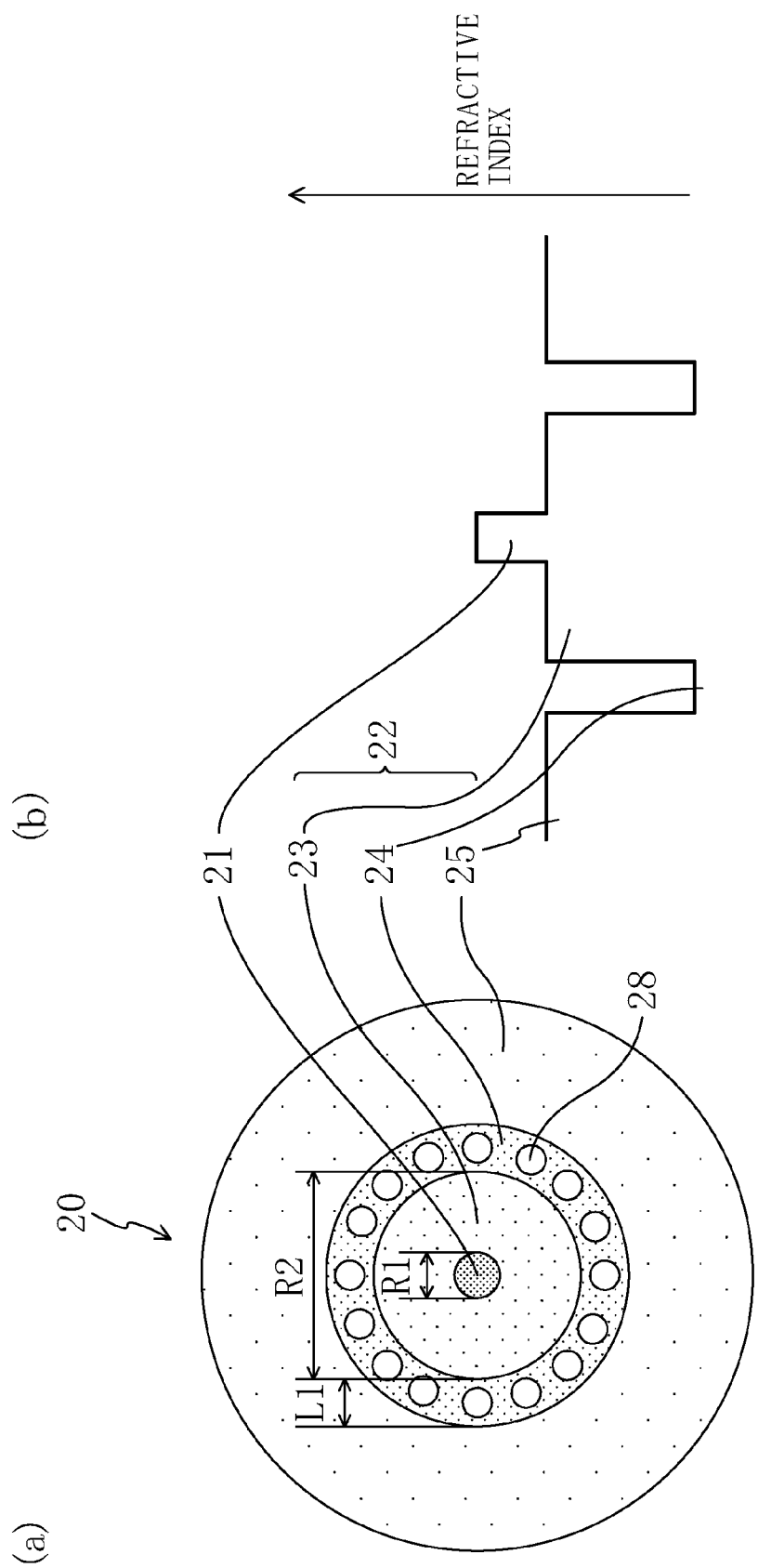
FIG. 2(a) is a schematic cross-sectional view of a second single-mode fiber.
FIG. 2(b) is a refractive index profile.

A cladding 22 of the second SMF 20 includes a plurality of concentric layers as illustrated in FIG. 2. The second SMF 20 is configured to include a core 21, a first cladding 23, a second cladding 24, and a third cladding 25 in a sequential order from the fiber center.

The core 21 is produced by doping quartz with germanium, and has a high refractive index, and the diameter R1 of the core 21 falls within a range of greater than or equal to 8.2 μm and less than or equal to 10.2 μm. The first cladding 23 is made of pure quartz to surround the outer surface of the core 21, and has a lower refractive index than that of the core 21, and the outer diameter R2 of the first cladding 23 falls within a range of greater than or equal to 30 μm and less than or equal to 45 μm. The second cladding 24 surrounds the outer surface of the first cladding 23, and has a lower effective refractive index than that of the first cladding 23; the relative index difference between the first cladding 23 and the second cladding 24 is greater than or equal to 0.5%; and the thickness L1 of the second cladding 24 is greater than or equal to 7.4 μm (in this embodiment, 10 μm). The third cladding 25 surrounds the outer surface of the second cladding 24, and has a higher refractive index than that of the second cladding 24, and the relative index difference between the third cladding 25 and the second cladding 24 is greater than or equal to 0.5%. The outer diameter of the third cladding 25 is 125 μm. The above-described refractive indexes denote refractive indexes at the wavelength of transmission light.

Holes 28 are formed in the second cladding 24 to extend along the core 21. The holes 28 are located around the first cladding 23. The refractive index of the second cladding 24 is an effective refractive index obtained by computing the average, which is weighted by the ratio between the area of the holes 28 in a fiber cross section and that of the quartz surrounding the holes 28 in the fiber cross section, of the refractive indexes of air and the quartz. In the second SMF 20, the third cladding 25 serves as a support, and the first and second claddings 23 and 24 serve to confine light.

Since the first SMF 10a, the output SMF 10b, and the second SMF 20 are single-mode fibers, they each have a normalized frequency greater than or equal to 2.405. The normalized frequency of the second SMF 20 is preferably less than or equal to 3.9.

Assume that the first SMF 10a and the output SMF 10b are, e.g., optical fibers which each include the core 11 obtained by doping quartz with germanium and the cladding 12 made of quartz, in which the relative index difference between the core 11 and the cladding 12 is 0.35%, and of which the core diameter is 9 μm. In this case, when the wavelength of transmission light is 1.31 μm, the normalized frequency of each of the first SMF 10a and the output SMF 10b is 2.62.

An end portion of the second SMF 20 connected to the first SMF 10a is configured such that corresponding portions of the holes 28 are filled over the length L0 to allow a corresponding portion of the second cladding 24 to be solid. The length L0 is greater than or equal to 2 mm and less than or equal to 30 mm. A portion of the second SMF 20 corresponding to the length L0 is a portion thereof in which light in the mode LP11 is lost. Specifically, when the normalized frequency of the portion of the second SMF 20 corresponding to the length L0 is greater than or equal to 2.405, the mode LP11 is significantly attenuated within the length L0, and when the normalized frequency of the portion of the second SMF 20 corresponding to the length L0 is less than 2.405, the mode LP11 is completely blocked within the length L0. Therefore, even with the mode LP11 generated in the second SMF 20 due to core misalignment at the interface C1 between the first SMF 10a and the second SMF 20, the mode LP11 is blocked or significantly attenuated in the portion of the second SMF 20 corresponding to the length L0, and thus, MPI is not caused or hardly caused at the interface C2 between the second SMF 20 and the output SMF 10b. When the length L0 is less than 2 mm here, the mode LP11 is not attenuated enough, thereby making it difficult to significantly reduce MPI. When the length L0 exceeds 30 mm, a portion of the second SMF 20 having high bending loss becomes correspondingly longer, and thus, a protective material needs to be provided to protect the portion of the second SMF 20 from bending.

The portion of the second cladding 24 which corresponds to the length L0 and is solid is formed by filling corresponding portions of the holes 28. Processes for eliminating the corresponding portions of the holes 28 include various processes, such as a process in which the corresponding portions of the holes 28 are filled with a material and a process in which the corresponding portions of the holes are filled by melting a component material by heat. A process in which heat is applied to the end portion of the second SMF 20 by a gas burner, discharge, or laser, etc., is simple, and allows the length L0 to be easily adjusted.

Figure 3:
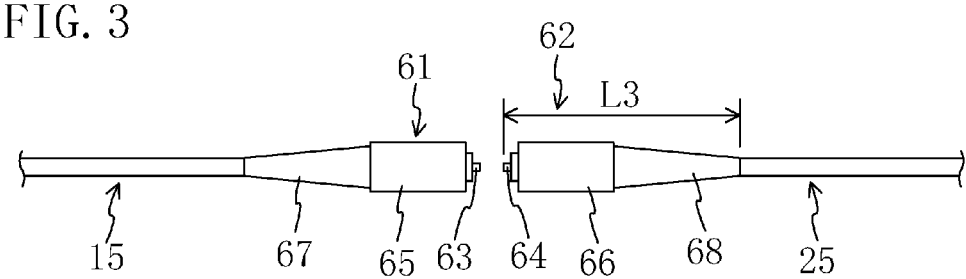
FIG. 3 is a schematic view of connectors.

The above-described connection between optical fibers is provided using connectors 61 and 62 illustrated in FIG. 3. The connectors 61 and 62 are fitted to one end of a coated optical fiber 15 obtained by coating the first SMF 10a and one end of a coated optical fiber 25 obtained by coating the second SMF 20, respectively. Ferrules 63 and 64 are contained in the connectors 61 and 62, respectively, and end surfaces of both of the fibers are exposed at ends of the ferrules 63 and 64 while portions of the first SMF 10a and the second SMF 20 in which corresponding portions of the holes 28 are filled are held in the ferrules 63 and 64, respectively. The two connectors 61 and 62 are connected and fixed to each other through adapters 65 and 66 with end portions of the ferrules 63 and 64 opposed to each other. The connection and fixation allows end surfaces of the first SMF 10a and the second SMF 20 to be fixed while being opposed to each other so that the centers of the end surfaces coincide with each other. The cores 11 and 21 of the first SMF 10a and the second SMF 20 may be connected to each other while being misaligned because the core of an optical fiber may deviate from the center of a cross section of the optical fiber, and the accuracies with which the connectors 61 and 62 are fabricated are not currently high enough to allow the centers of cores to coincide with each other.

Bending of the connectors 61 and 62 is restricted to prevent the radius of curvature of portions of the optical fibers located inside the adapters 65 and 66 and protectors 67 and 68 adjacent to the adapters 65 and 66, respectively, from being reduced. The portion of the second SMF 20 which corresponds to the length L0 and in which corresponding portions of the holes 28 are filled is contained in the adapter 66 and the protector 68 (which combine together to form the connector 62), and is protected from excessive bending. Depending on the types of a connector, the length L3 of a portion of the second SMF 20 protected from bending is 30-60 mm. The portion of the second SMF 20 which corresponds to the length L0 and in which corresponding portions of the holes 28 are filled is contained in the protective portion (inside the connector), and is protected from bending. Therefore, no bending loss is caused. Furthermore, the entire portion of the second SMF 20 which corresponds to the length L0 and in which the corresponding portions of the holes 28 are filled is preferably contained in the ferrule 64 because the portion is reliably protected from bending.

Connectors are preferably used similarly to provide connection between the second SMF 20 and the output SMF 10b.

As seen from the above, in this embodiment, a portion of the second cladding 24 corresponding to the end portion of the second SMF 20 connected to the first SMF 10a is made solid over the length L0 by filling corresponding portions of the holes 28, thereby reducing MPI. This can reduce noise added to information to be transmitted, can also reduce the power fluctuations and noise variation with variation in temperature, and can improve transmission quality (error rate, etc.). Furthermore, since the length L0 over which portions of the holes 28 are filled is short, such as 2-30 mm, and thus, the portion of the second SMF 20 corresponding to the length L0 is contained inside the corresponding connector without reducing the flexibility in designing the second SMF 20, the portion of the second SMF 20 is protected from bending, thereby allowing the bending loss to be substantially zero. The normalized frequency of the portion of the second SMF 20 in which a corresponding portion of the second cladding is solid is preferably less than 2.405.

Second Embodiment

A second embodiment is an embodiment relating to a second SMF. Unlike the first embodiment, not a portion of the second SMF connected to a first SMF but an optional portion of the second SMF has a structure reducing MPI. Therefore, a difference from the first embodiment will be described below.

Figure 4:
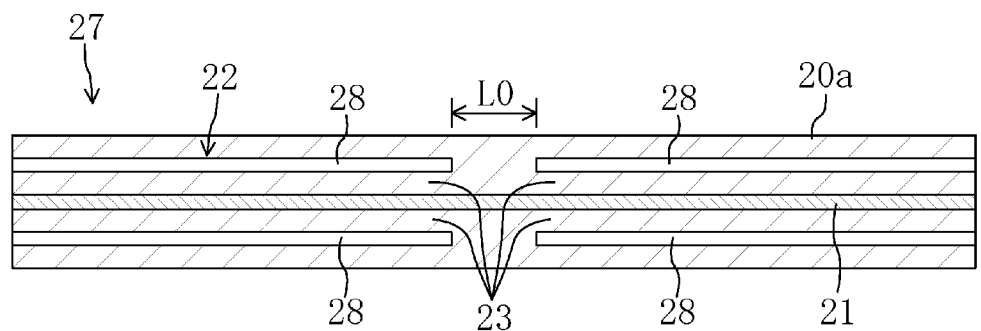
FIG. 4 is a schematic cross-sectional view of an optical fiber according to a second embodiment.

As illustrated in FIG. 4, not a longitudinal end portion of a second SMF 27 of this embodiment but a central portion thereof is made solid by filling corresponding portions of holes 28 over the length L0. The longitudinal location of the portion of the second SMF 27 in which the corresponding portions of the holes 28 are filled is optional. The length L0 is greater than or equal to 2 mm and less than or equal to 30 mm. As a process for filling the corresponding portions of the holes 28, the same process as in the first embodiment may be used.

When the second SMF 27 of this embodiment is connected through connectors to the first SMF 10a of the first embodiment, and cores are misaligned at the interface, light in the mode LP11 is generated. The attenuation factor of the light in the mode LP11 is low in a region where the holes 28 exist, and thus, the light in the mode LP11 is transmitted without being attenuated very much. By contrast, the attenuation factor of the light in the mode LP11 is high in a region where portions of the holes 28 are filled, and thus, all or most of light beams in the mode LP11 are lost in this region. Therefore, MPI is never or hardly caused in an end portion of the second SMF 27 located near the light exit.

The second SMF 27 of this embodiment can reduce MPI, and can reduce noise in a transmission signal. Since a portion of the second SMF 27 in which corresponding portions of the holes 28 are filled may be optionally located, this ensures sufficient flexibility in designing an optical fiber.

Other Embodiments

The above embodiments are set forth for the purposes of examples of the present invention, and the present invention is not limited to these examples. For example, a single second SMF may include a plurality of portions in which corresponding portions of holes 28 are filled. In the first embodiment, portions of the holes 28 corresponding to both end portions of the second SMF 20 may be filled.

As long as the first SMF 10a, the output SMF 10b, and the second SMFs 20 and 27 are configured to function as the above-described optical fibers, the fibers may be different from those in the above embodiments.

INDUSTRIAL APPLICABILITY

As described above, the optical fiber connection structure according to the present invention reduces MPI, and is useful as an optical fiber connection structure, etc., for optical communications.

DESCRIPTION OF REFERENCE CHARACTERS

10a First Single-Mode Fiber
11 Core
20, 27 Second Single-Mode Fiber
21 Core
22 Cladding
23 First Cladding
24 Second Cladding
25 Third Cladding
28 Hole
61, 62 Connector

The invention claimed is:

1. An optical fiber structure in which transmission light is input through a first single-mode fiber to a second single-mode fiber, wherein the second single-mode fiber includes a core, a first cladding, and a second cladding having a lower refractive index than that of the first cladding at a wavelength of the transmission light, the core, the first cladding, and the second cladding are arranged concentrically in a sequential order from a center of the second single-mode fiber, the second single-mode fiber has a normalized frequency greater than or equal to 2.405 and less than or equal to 3.9, holes are formed in the second cladding to extend along the core, and portions of the holes corresponding to an end portion of the second single-mode fiber connected to the first single-mode fiber are filled over a length greater than or equal to 2 mm and less than or equal to 30 mm so that a corresponding portion of the second cladding is solid.

2. The optical fiber connection structure of claim 1, wherein
   the second single-mode fiber further includes a third cladding outside the second cladding,
   the core has a diameter greater than or equal to 8.2 μm and less than or equal to 10.2 μm,
   the first cladding has a lower refractive index than that of the core at the wavelength of the transmission light and an outer diameter greater than or equal to 30 μm and less than or equal to 45 μm,
   the second cladding has a thickness greater than or equal to 7.4 μm, and
   a relative index difference between the first cladding and the second cladding is greater than or equal to 0.5%.

3. The optical fiber connection structure of claim 1, wherein
   the first single-mode fiber and the second single-mode fiber are connected together through a connector, and
   the end portion of the second single-mode fiber in which the corresponding portion of the second cladding is solid is contained inside the connector.

4. A single-mode fiber comprising:
   a core;
   a first cladding; and
   a second cladding,
   wherein the core, the first cladding, and the second cladding are arranged concentrically in a sequential order from a center of the single-mode fiber,
   the single-mode fiber has a normalized frequency greater than or equal to 2.405 and less than or equal to 3.9,
   holes are formed in the second cladding to extend along the core, and
   portions of the holes corresponding to at least one portion of the single-mode fiber in a longitudinal direction are filled over a length greater than or equal to 2 mm and less than or equal to 30 mm so that a corresponding portion of the second cladding is solid.

5. The single-mode fiber of claim 4, further comprising:
   a third cladding located outside the second cladding,
   wherein the core has a diameter greater than or equal to 8.2 μm and less than or equal to 10.2 μm,
   the first cladding has a lower refractive index than that of the core at a wavelength of transmission light and an outer diameter greater than or equal to 30 μm and less than or equal to 45 μm,
   the second cladding has a lower refractive index than that of the first cladding at the wavelength of the transmission light and a thickness greater than or equal to 7.4 and
   a relative index difference between the first cladding and the second cladding is greater than or equal to 0.5%.

6. The single-mode fiber of claim 4, wherein
   a portion of the single-mode fiber in which a corresponding portion of the second cladding is solid is formed by filling corresponding portions of the holes by heat.

\* \* \* \* \*